H. L. DECKER.
LIQUID GAGE.
APPLICATION FILED NOV. 7, 1917.
1,286,953.
Patented Dec. 10, 1918.
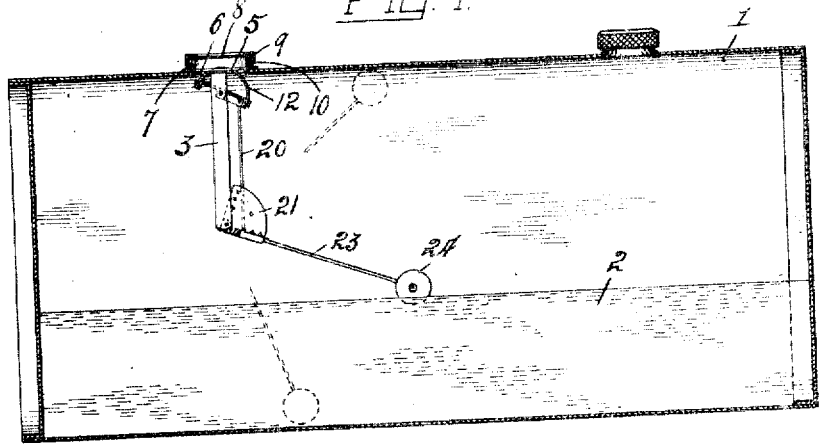
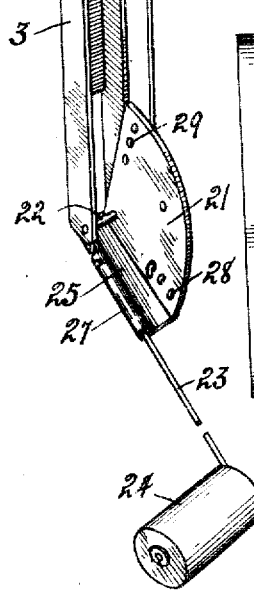
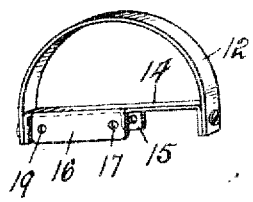
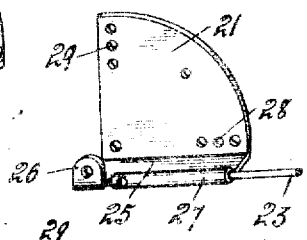
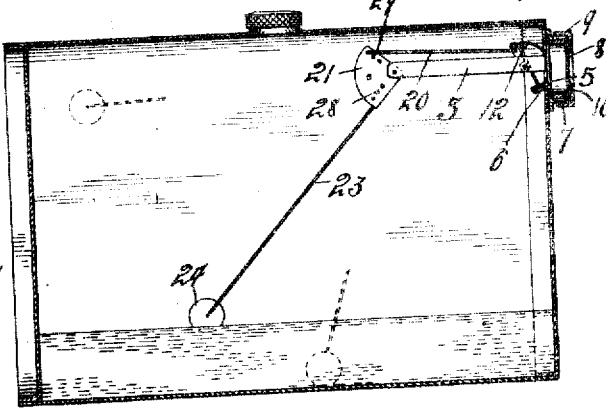
INVENTOR
Hugh L. Decker
By Owen, Owen & Crampton
His attys.

UNITED STATES PATENT OFFICE.

HUGH L. DECKER, OF TOLEDO, OHIO, ASSIGNOR TO THE W. G. NAGEL ELECTRIC COMPANY, OF TOLEDO, OHIO, A CORPORATION OF OHIO.

LIQUID-GAGE.

1,286,953.  Specification of Letters Patent.  Patented Dec. 10, 1918.

Application filed November 7, 1917. Serial No. 200,739.

*To all whom it may concern:*

Be it known that I, HUGH L. DECKER, a citizen of the United States, and a resident of Toledo, in the county of Lucas and State of Ohio, have invented a certain new and useful Liquid-Gage; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to liquid gage means, and is particularly intended for use in connection with the gasolene tanks of automobiles, but may be used in connection with other liquid containing tanks to indicate the quantity of contents thereof.

The object of my invention is the provision of a simple and improved gage of this character, which is inexpensive in its construction and capable of having the parts thereof easily and quickly assembled, whereby to enhance the practicability and commercial value of such gage.

A further object of my invention is the provision of a gage of the character described, which is capable of easy adjustment to suit the depth of the tank or container to which applied so that the float, when at empty, full or any intermediate position with respect to the particular tank with which associated, irrespective of the shape or size of such tank, bears the proper relation to the indicator member to cause said member to correctly designate the height of the liquid in the container.

A further object of my invention is the provision of a gage of the class described, in which one graduated indicator segment can be used for any particular style of tank irrespective of size, that is, with round or cylindrical shaped tanks as an indicator segment having a standard scale is interchangeable with all sizes of such tanks, thus simplifying the manufacture of gages and eliminating the necessity of specially graduated segments to conform to the capacity of the tank.

A further object of my invention is the provision of a gage of the character described, which is capable of being easily and quickly converted into a gage of either the top or end reading type to suit the style or size of the container with which associated.

The invention is fully described in the following specification, and while, in its broader aspect, it is capable of embodiment in numerous forms, a preferred embodiment thereof is illustrated in the accompanying drawings, in which—

Figure 1 is a central vertical longitudinal section of a tank with my improved gage associated therewith and in position to be read from the top of the tank. Fig. 2 is an enlarged perspective view of the gage together with a fragmentary portion of a tank. Fig. 3 is a central vertical longitudinal section of a tank, with my invention associated therewith and in end reading position. Fig. 4 is an enlarged perspective view of the indicator member of the gage, and Fig. 5 is an enlarged perspective view of the motion converting member to which the float is attached.

Referring to the drawings, 1 designates a tank and 2 liquid contained therein.

The gage embodying my invention comprises a frame-bar 3, which, for the purpose of cheapness and strength and also to facilitate a carrying of the different parts thereby, as hereinafter described, is preferably stamped from sheet metal in channel form and has the bottom 4 of its channel cut away at each end to adapt the side flanges of the channel-bar to form fork-arms at the respective ends between which different movable parts of the gage are mounted. The fork-arms of the bar, at what may be termed the upper or outer end of the frame-bar, are fixed at their outer ends to a disk 5, which is of suitable size relative to an opening 6 in the tank through which the frame-bar may be projected to rest on the marginal edge wall of such opening to limit the movement of the frame-bar therethrough. The disk 5 may be seated within a flange or cup-shaped part 7 projecting outward from the tank wall in surrounding spaced relation to the opening 6 and the outer end thereof closed by a transparent member 8, such, for instance, as glass, which is removably held in closing position by a collar 9, that is threaded on the flange 7. A gasket-ring 10 may be disposed within the flange 7 with its inner end bearing against the marginal edge of the disk 5 and its outer end bearing against the transparent member 8, whereby a screwing of said member home will cause the gasket-ring to firmly hold the disk 5 to its seat, as is well understood in the art.

The disk 5 is provided with an opening 11 intermediate the associated fork-arms of the frame-bar 3 and an indicator-segment 12, which is pivoted to said fork-arms for oscillatory movements therebetween, has a restricted portion of its periphery projecting through or exposed to the opening 11 whereby designations on the segment 12 may be read through said opening. This segment is provided in successive order on its periphery with height designations for the liquid contained in the tank, such designations being, for instance, 0, 1/4, 1/2, 3/4 and F, each of which is associated with a cross-line on the segment, which, at predetermined points in a movement of the segment, register with a cross or center-line 13 provided on the outer face of the disk 5 at the sides of the opening 11 substantially centrally thereof.

The segment 12, in the present instance comprises a strip of sheet metal, which is bent in an arc and carried at its ends by a cross-bar 14, which is also preferably stamped from sheet metal. This cross-bar is provided at its central portion with side ears 15, 16, which are apertured, as at 17, in coaxial relation to the segment 12 to receive a pivot-pin 18, which spans the space between the outer fork-arms of the frame-bar and is fixed at its ends in the respective arms. The ear 16 is extended to adjacent one end of the cross-bar 14 and provided with an aperture 19 for pivotally receiving one hooked or bent-end portion of a draft-rod 20, longitudinal movements of which communicate rocking movements to the indicator-segment.

The draft-rod 20 extends lengthwise of the frame-bar 3 and is pivotally connected at its lower end to a motion converting member 21, which, in the present instance, is in the form of a quadrant and pivotally mounted at its apex on a pivot-pin 22, which spans the space between the fork-arms at the lower end of the frame-bar and is fixed thereto. The float-arm 23 fixedly projects from the member 21 transverse to its pivot and carries a float 24 at its outer end. The member 21, in the present instance, is stamped from sheet metal and is provided at one substantially radial edge with a laterally projecting flange 25, which has an apertured bearing ear 26 projecting from its inner end portion to coöperate with the body portion of the member 21 to pivotally engage the pivot-pin 22. This flange also has its side edge rolled upon itself, as at 27, to form a holding socket for receiving the inner end of the float-arm 23 and firmly carrying said arm with relation to the member 21.

The member 21 may be provided with a plurality of apertures, with any one of which the inner end of the draft-rod 20 may be engaged to properly adjust the float member with respect to the indicator-segment 12 to suit the tank with which associated so that the float, when at empty, full or intermediate position with respect to the tank, bears the proper relation to the indicator-segment to correctly designate its position. The apertures in the member 21, in the present instance, comprise a set 28 and a set 29, which are radially spaced along different side edges of the member 21, and apertures may also be distributed in other positions in the member to suit conditions which may be met. The draft-rod 20 is engaged in one of the apertures 28, in the present instance, when the gage is used in upright position or in position to be read from the top of a tank, and the draft-rod is engaged in one of the apertures 29 when the gage is used in horizontal position to be read from an end or side of a tank, as illustrated in Fig. 3. The member 21 is made in quadrant form to adapt it for use in connection with the gage when used either in horizontal or vertical position, and it is apparent that if the gage is intended for use in other than vertical or horizontal positions the form of the member 21 will be changed accordingly. It is also evident that while I have shown the member 21 as provided with a particular arrangement of draft-rod receiving apertures, the invention is not restricted to any particular location of such apertures as the same may be changed to suit conditions which may be met with in installing or adapting the gage for tanks of different styles and sizes and to suit the adjustment of the float with respect to the indicator-segment for any particular tank or condition to obtain a correct reading.

I wish it understood that my invention is not limited to any specific construction, arrangement or form of the parts, as such arrangement and construction may be varied within a wide range without departing from the spirit of the claims.

Having thus described my invention, what I claim as new, and desire to secure by Letters Patent, is—

1. In a gage of the class described, a frame U-shaped in cross section with its side flanges extended longitudinally at both ends beyond the connecting web portion to provide the frame with end forks, an indicator member pivotally mounted in one end fork and a motion converting element pivotally mounted in another end fork of the frame, a draft member connecting said indicator member and element to communicate rocking movements from one to the other, and a float projecting from said element.

2. In a gage of the class described, a frame U-shaped in cross section with its side flanges extended longitudinally at both ends beyond the connecting web portion to provide the frame with end forks, an indicator member pivotally mounted in one end fork and a motion converting element pivotally mounted in the other end fork of the frame, a draft member adjustably connecting said indicator member and element, and a float projecting from said element.

3. In a gage of the class described, a frame, a segmental indicator member and a motion converting element each pivoted to said frame in spaced relation longitudinally thereof and for relative rocking movements in a plane lengthwise of the frame, a float connected to said element and operable to impart rocking movements thereto, and a draft-rod pivoted at one end to said member and having its other end pivoted to said element, said rod being adjustable with respect to said element to suit varying conditions.

4. In a gage of the class described, a frame, a segmental indicator member pivoted to said frame adjacent one end thereof, a quadrantal motion converting element pivoted to the other end of said frame, a connection between said member and element for communicating rocking movements from one to the other and adjustable with respect to the element to connect the same at different positions relative to the element axis, and a float connected to said element and operable to rock the same.

5. In a gage of the class described, a frame U-shape in cross section and having its ends forked, a plate carried at the outer end of said frame and having an opening therein, an indicator member pivoted within the outer fork of said frame and having an arcuate portion bearing designations which move into register with the plate opening upon rocking movements of said member, a motion converting element pivoted in the inner forked end of the frame, a float connected to said element and operable to impart rocking movements thereto, and connection between said element and member for imparting rocking movements from one to the other.

6. In a gage of the class described, a frame having a plate at one end provided with an opening, an indicator member pivoted to said frame and comprising a segmental part having designations which are successively readable through said plate opening upon a rocking movement of said member, a cross-part connecting the ends of and carrying said segmental part and pivoted centrally to the frame, a motion converting member pivoted to said frame in spaced relation to said indicator member for rocking movements in a plane with the rocking movements of said member, a draft-rod connecting said member and element to communicate rocking movements from one to the other, and a float connected to said element and operable to impart rocking movements thereto.

7. In a gage of the class described, a frame, an indicator member pivoted to one end of said frame, a motion converting element pivoted to said frame in spaced relation to said member, said element being in the form of a sector and having a flange projecting from one edge thereof and provided with a pivot bearing ear, a float-arm fixed to and projecting from said flange, and a draft-rod pivoted at one end to said indicator member and having its other end adjustably connected to the sector portion of said element.

8. In a gage of the class described, a frame, an arcuate indicator member pivoted to one end of said frame, a motion converting element pivoted to the frame in spaced relation to said member, said element being in the form of a sector, and a draft member connecting said indicator member and element and adapted to be pivotally connected to said element in different radial planes thereof, and a float-arm projecting from said element.

9. In a gage of the class described, a frame, an indicator member pivoted to said frame, an element pivoted to said frame in spaced relation to said member, said element being in the form of a sector and having circumferentially spaced sets of openings with the openings of each set radially spaced, a draft rod projecting from said indicator member and adapted to be pivotally engaged with any one of the openings in said element, and a float arm projecting from said element.

10. In a gage of the class described, a frame comprising spaced parallel side bars rigidly connected intermediate their ends, an indicator member pivoted between said side bars at one end, a motion converting element pivoted between said side bars in the other end of the frame, said member and element having their rocking axes parallel, a float arm projecting from said element, and draft means connecting the member and element for converting predetermined rocking movements from one to the other.

11. In a gage of the class described, a frame having a pair of spaced parallel side bars rigidly connected together, a plate fixed to said frame at one end and having an opening in register with the space between the side bars, a segmental indicator member pivoted between said side bars adjacent to said plate in position for its periphery to register with said opening, a motion converting element pivoted between said bars at the other end of the frame, a float arm projecting from said element, and draft means connecting said member and element for imparting predetermined rocking movements from one to the other thereof.

12. In a gage of the class described, a frame having a pair of spaced parallel side bars rigidly connected together, a plate fixed to said frame at one end and having an opening in register with the space between the side bars, a segmental indicator member pivoted between said side bars adjacent to said plate in position for its periphery to register with said opening, a motion converting element in the form of a sector pivoted between the frame bars at the other end thereof, a float arm projecting from said element, and a draft rod connected at one end to said member and adapted to be adjustably connected in a pivotal manner to said element to suit the arc in which it is desired to have the float arm operate relative to the plane of projection of said frame.

In testimony whereof, I have hereunto signed my name to this specification.

HUGH L. DECKER.